July 3, 1962

K. S. ARVANITAKIS 3,042,214

FILTER APPARATUS

Filed Dec. 16, 1958

2 Sheets-Sheet 1

INVENTOR
KOSTAS S. ARVANITAKIS
BY Richard G. Wynne &
John A. Frieken
ATTORNEYS

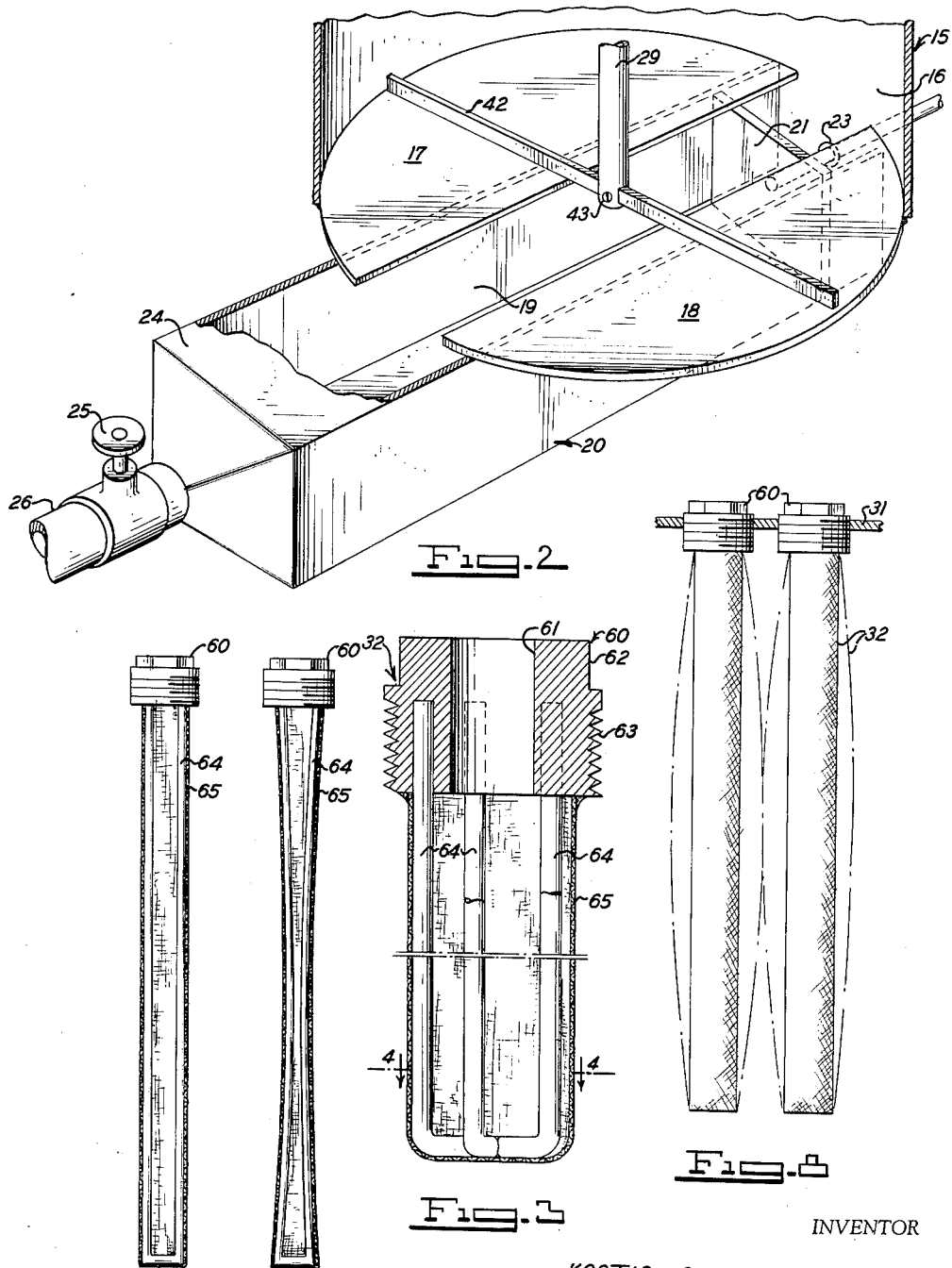

United States Patent Office 3,042,214
Patented July 3, 1962

3,042,214
FILTER APPARATUS
Kostas S. Arvanitakis, Farrell, Pa., assignor to Arvan Products, Inc., Sharpsville, Pa., a corporation of Pennsylvania
Filed Dec. 16, 1958, Ser. No. 780,869
1 Claim. (Cl. 210—330)

My invention relates to an improved filter apparatus for removing solids from a liquid which includes means for the easy removal of the solids from the filter unit. More specifically, my invention relates to an improvement in filter apparatus used for rejuvenating dry cleaning fluids which employs flexible filter tubes which can be flexed and moved to cause easy dislodgment of filter cake from the tubes and from the filter unit.

In the dry cleaning industry today, there are many filters which accomplish the rejuvenation of the dry cleaning fluid in a satisfactory manner. In the normal operation a filter aid, such as diatomaceous earth, is added to the fluid to facilitate the removal of dirt from the fluid by passing through filtering or screening surfaces, the filter aid forms a cake which has fluid passages therethrough and thereby accomplishes the filtering operation. The cake, however, has presented a problem of removal as it tends to cling to the filter unit. When bridging of adjacent cake formations occurs, a disassembly of the unit may be required for effective cake removal.

The primary problem of efficient filtering was met by the use of a filter aid; this, in turn, has caused the operator of a dry cleaning business considerable secondary problems with the removal of the resultant cake. My invention provides an effective removal system which is easy to operate and which effectively eliminates the cake removal problem.

My invention comprises a tank into which the used fluid is pumped under pressure. The fluid passes through flexible filter units to the outlet from the tank. The filter units are mounted on a rotatable means whereby they may be moved through arcuate paths to dislodge cake formations on their outer surfaces and also cause destruction of cake bridges between adjacent filter units. The flexibility of the elongated filter units is also available for cake formation dislodgement; by the application and removal of fluid pressure in the tank the filter units are flexed and the cake is caused to break up and fall from the filter units. As will be seen hereinafter, the filter apparatus of my invention includes an improved sealing design for the separation of used fluid from rejuvenated fluid to prevent contamination. Also, an improved scraper system and piston discharge is combined for the discharge of dislodged cake from the filter apparatus.

Figure 1:
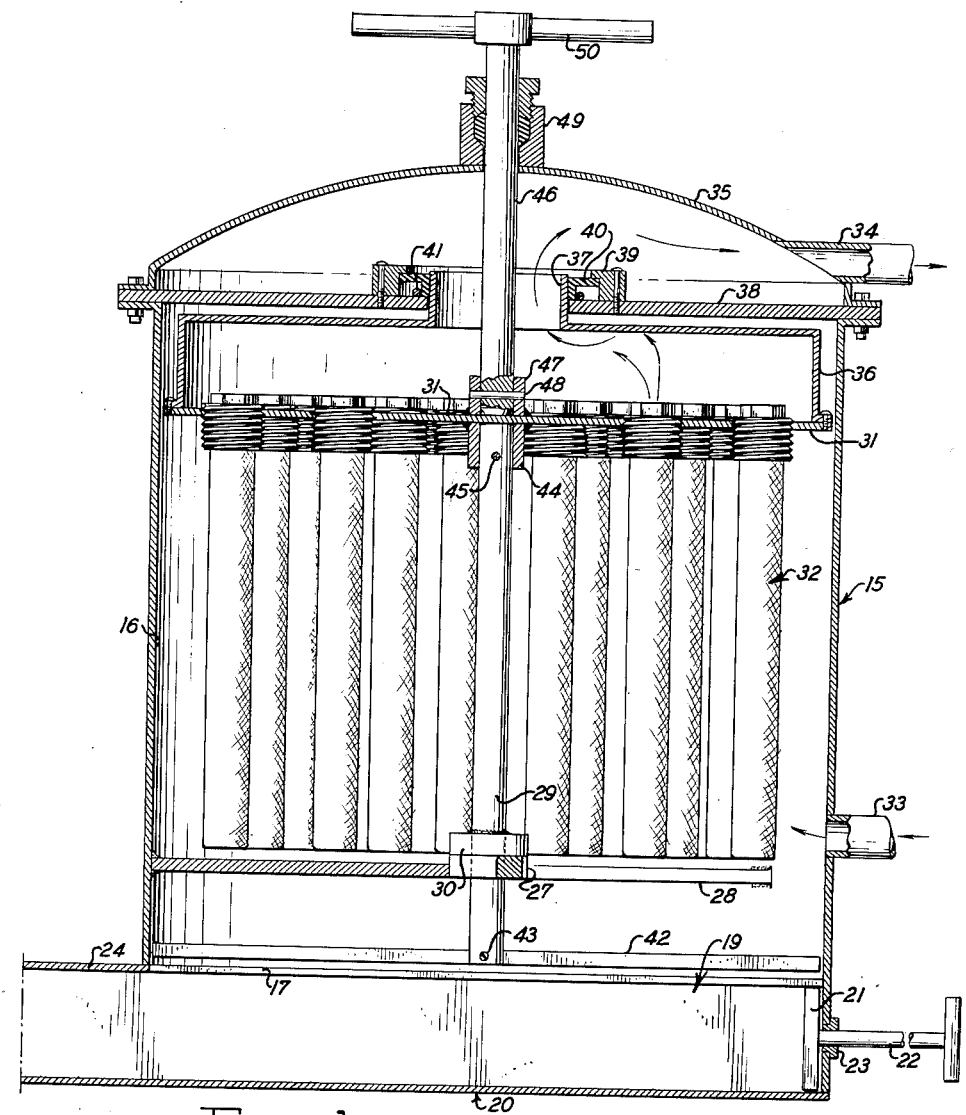
Figure 4:
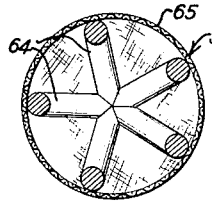
Figure 5:
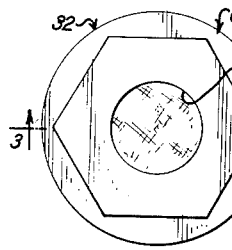
Figure 9:
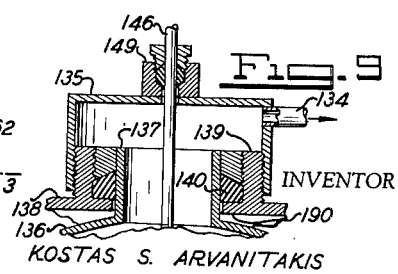

FIGURE 1 is a front view in section of my invention;
FIGURE 2 is a perspective view of the lower portion of my filter apparatus showing the scraper system and piston discharge means;
FIGURE 3 is a view taken on line 3—3 of FIGURE 5 showing a filter unit in cross section;
FIGURE 4 is a view taken on line 4—4 of FIGURE 3;
FIGURE 5 is a top view of a filter unit;
FIGURE 6 is a front view in section on an enlarged scale of a filter unit in unflexed condition;
FIGURE 7 is a view similar to FIGURE 6 with the filter unit in inward flexed condition;
FIGURE 8 shows two filter units with a cake formation between them shown in phantom lines; and
FIGURE 9 is a front view in section on reduced scale of the preferred sealing arrangement at the top of the unit.

Referring now to FIGURE 1, it will be seen that my invention comprises a tank, generally indicated by numeral 15, which has a cylindrical side wall 16 and opposed chordal segments 17 and 18 (FIGURE 2) which form the bottom having a cake discharge opening 19 therein. A discharge hopper 20 is affixed to the bottom in sealing relationship to the bottom opening. A piston 21 is reciprocatably mounted in the hopper and is guided throughout its travel by the bottom and side walls of the hopper and the overhanging portions of the bottom chordal segments 17 and 18. The piston has a hand-operated piston rod 22 which passes through a sealing gland 23 in one end wall of the hopper 20. A discharge conduit 24 is formed at the other end of the hopper; valve 25 is opened when cake is discharged by the piston. The discharge conduit 24 enables packing cake in a closed conduit downstream of the opening 19 for final discharge through the smaller valved conduit 26.

A thrust bearing 27 of any suitable type is positioned in spaced relation above the bottom of the tank by support means such as horizontally radiating arms of the spider 28 which are welded to the inner wall 16 of the tank.

A filter support and tank cleaning assembly is rotatably mounted within the tank by means of a central shaft 29 which passes through the thrust bearing 27 and has a bearing flange 30 affixed thereto which seats upon the bearing 27. The upper end of shaft 29 is affixed to a circular filter tube plate 31 to which are removably attached a plurality of filter tubes 32 (FIGURES 3-8), the filter tubes 32 extending downwardly from the plate 31 and terminating just above the spider 28.

The used filter fluid is delivered under pressure to the inlet 33 in the lower portion of the tank 15 just above the spider 28. Rejuvenated or filtered fluid is discharged from the upper part of the tank 15, and in the embodiment shown in FIGURE 1 an outlet 34 is provided in the tank dome 35.

To cause flow through the filter units 32 while allowing periodic rotation of the filter support and tank cleaning assembly, I provide partition means which divides the tank into a used fluid chamber and a rejuvenated fluid chamber. As seen in FIGURE 1, an embodiment of this partition means includes cap 36 enclosing a chamber above the top discharge ends of filter units 32, the cap 36 being sealed to and fixedly connected to the peripheral portion of the circular filter tube plate 31. The central portion of the cap 36 has a central opening therethrough and an annular axle-like collar 37 extending axially upward therefrom. Sealing and bearing means are provided for engaging the outer annular surface of the axle-like collar 37; the embodiment in FIGURE 1 including a horizontal dividing plate 38 mounted in a sealed joint with the flanges of the dome 35 and the tank wall 16. Surrounding the opening at the center of plate 38 is a hold-down ring 39 affixed to the plate 38 and housing a resilient annular seal and bearing ring 40. The ring 40 is urged into tight sealing engagement with the axle-like collar by means of a metal spring 41.

The bottom end of central shaft 29 has a wiper blade 42 removably affixed thereto by screw 43, the blade being set just above the chordal bottom segments 17 and 18 to facilitate rotation.

It will be noted that the central shaft 29 is affixed to the tube plate 31 by means of a bottom socket 44 which is welded to the plate 31 and a locking pin 45.

To accomplish rotation of the filter support and tank cleaning assembly, an actuating rod 46 is attached through socket 47 and pin 48 to the tube plate 31 in a manner similar to the attachment of central shaft 29. The actuating rod 46 passes centrally upwardly from the plate 31, through the collar 37 and through an adjustable packing gland 49. A handle 50 is provided for actuation.

As seen in FIGURES 3-5, each filter unit 32 includes an annular member 60 which provides a rejuvenated fluid discharge hole 61 from the unit. The annular member 60 is formed as a bolt with a hexagonal head 62 and threads 63 which removably mount the unit in threaded openings in the plate 31. Five elongated pins 64 are affixed in equally spaced holes in the annular member 60 and extend axially therefrom. The outer ends of the pins 64 are bent inwardly and united as shown in FIGURE 4. A porous flexible tubular cover 65 completely encloses the pins 64 and is attached along its entire annular open end to the annular member 60 by soldering or the like as shown in FIGURE 3. The other end of the cover is closed around the bottom of the unit 32. The cover may be made of a suitable material such as metal or cloth; Monel metal screening has proved most satisfactory.

FIGURE 6 shows schematically the unit in unflexed condition for normal operation. FIGURE 7 shows schematically the flexing action of the flexible pin and screen combination which takes place when high pressure is applied through inlet 33 to dislodge cake. FIGURE 8 depicts in schematic form the formation of a bridge between adjacent units.

A preferred embodiment of the upper part of my filter apparatus is shown in FIG. 9 wherein parts similar to those shown in FIG. 1 are numeraled in the 100 series. For example, the cap 36 of FIG. 1 finds its counterpart in FIG. 9 as cap 136, cap 136 being arcuate to facilitate flow direction. The cap 136 has an annular axle-like collar 137 which extends upwardly through a sealing and bearing means mounted on the horizontal dividing plate 138 which serves in both embodiments as the top of the tank 15. Surrounding the opening at the center of plate 138 is an integral upwardly extending hold down ring 139 which is threaded on both its inner and outer surfaces. The hold down ring 139 is spaced annularly outwardly from the central hole through the plate 138 to provide a retaining ledge 190 for receiving a resilient annular seal and bearing ring 140. This ring 140 is wedged into tight sealing engagement with the ledge 190 and the collar 137. A dome 135 is sealably and threadedly mounted on the outer threaded surface of the hold down ring 139, this dome 135 including an adjustable packing gland 149 through which passes the actuating rod 146. The cap 135 is also provided with a rejuvenated or filtered fluid outlet 134.

It will be appreciated that the preferred embodiment of the upper structure of my filter apparatus provides an effective seal between chambers of used filter fluid and rejuvenated filter fluid in a most efficient manner. The plate 138 in the embodiment shown in FIG. 9 serves as the major top surface of the tank with the dome 135 being considerably reduced in size without reduction in effectiveness.

The filter apparatus disclosed in this application provides for hand operation of the discharge piston 21, as well as hand rotation of the filter support and tank cleaning assembly. It will be recognized that power means of suitable types may be employed for accomplishing these movements, either under manual control or through automatic timed sequential operation.

In the cake dislodgment and removal operation of my filter apparatus, the filter units are preferably caused to rotate through partial arcs with abrupt movements to accomplish dislodgment of the cake from the filter tubes. As the cake falls to the chordal bottom segments 17 and 18, the wiper plate 42 will clear the bottom by sweeping the cake through the discharge opening 19 into the discharge hopper 20.

During cake dislodgment from the filter tubes, an increased pressure may be placed on the inlet side of the apparatus by means of the fluid pump (not shown) which pumps used fluid to inlet 33. This will cause the flexible pins 64 and cover 65 of the filter tubes to be flexed inwardly, thereby aiding in the dislodgment of cake. It will be recognized also that no great pressure need be applied since the pressure differential between the outer surface of the filter tubes and the inside of the tubes will be increased as the thickness of cake increases. This feature will aid also in the cake dislodgment operation.

While a specific structure has been shown and described for illustrative purposes, it will be understood that the invention is not so limited and for that reason I wish to limit myself only within the scope of the appended claim.

I claim:

A cake-type filter apparatus comprising a cylindrical tank having a bottom formed of chordal segments, a support spider having a central thrust bearing rigidly connected to the lower portion of the tank's inner wall and spaced above the bottom, and an inlet at its lower portion above said spider; a seal plate having a central opening sealed to and extending horizontally across the top of said tank; a dome mounted on said seal plate having an outlet and a central bearing opening; and a filter support and tank cleaning assembly including a central shaft extending through the openings in the dome and seal plate and through the spider thrust bearing, a bearing flange rigidly affixed to the shaft and rotatably supported on said thrust bearing, said shaft including an upper operating portion and a lower support portion, a filter supporting plate rigidly affixed to the top of said support portion, a plurality of filter tubes removably mounted only in said plate, a cap sealably covering said plate and including a central upstanding flange passing through said seal plate opening, sealing means affixed to said plate and sealably engaging the outer surface of said flange, said shaft operating portion having its lower end rigidly affixed to the filter supporting plate to enable rotation thereof, a wiper blade affixed to the bottom end of the shaft lower portion adjacent said bottom, said bottom having an opening, a discharge hopper positioned below said opening having a valved outlet and a piston mounted therein for discharging sludge through said outlet.

References Cited in the file of this patent

UNITED STATES PATENTS

| 1,965,999 | Beatty | July 10, 1934 |
| 2,215,574 | Bernstein | Sept. 24, 1940 |
| 2,301,430 | Malanowski | Nov. 10, 1942 |
| 2,381,949 | Goodloe et al. | Aug. 14, 1945 |
| 2,854,091 | Roberts et al. | Sept. 30, 1958 |

FOREIGN PATENTS

| 563,706 | Great Britain | Aug. 28, 1944 |